Jan. 3, 1950 H. E. MALME 2,493,257
FILTER ATTACHMENT FOR RADIATORS
Filed Aug. 13, 1947 2 Sheets-Sheet 2
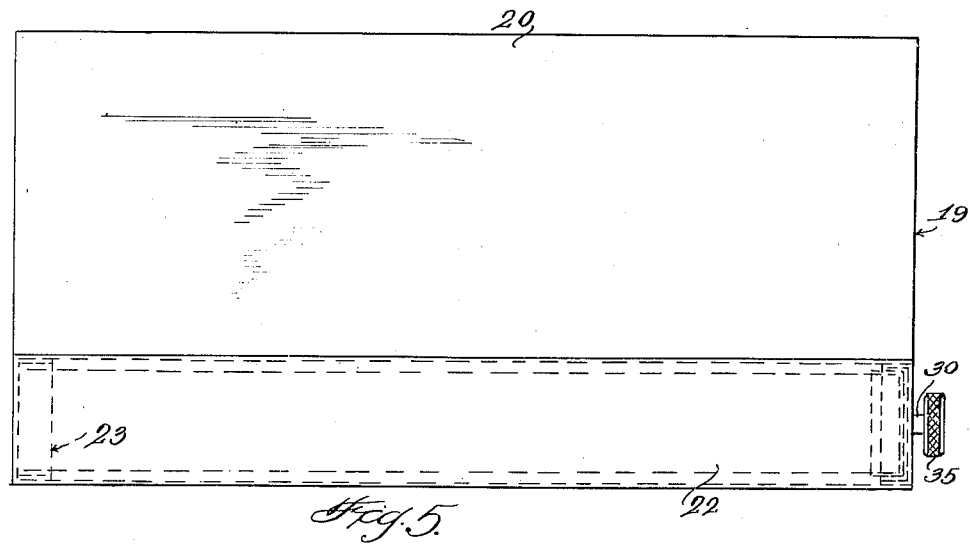
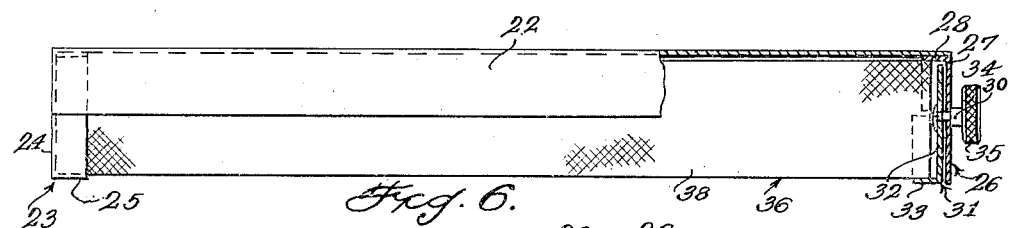
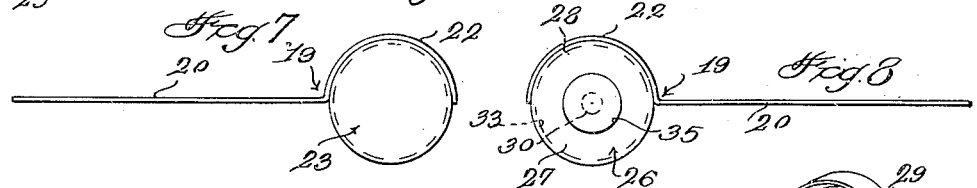
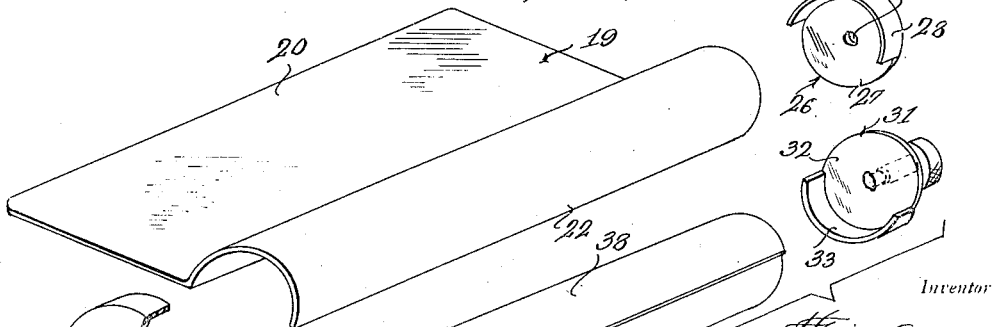
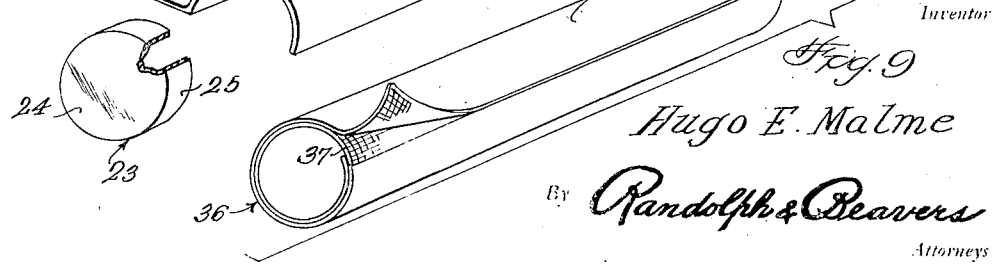
Inventor
Hugo E. Malme
By Randolph & Beavers
Attorneys Patented Jan. 3, 1950

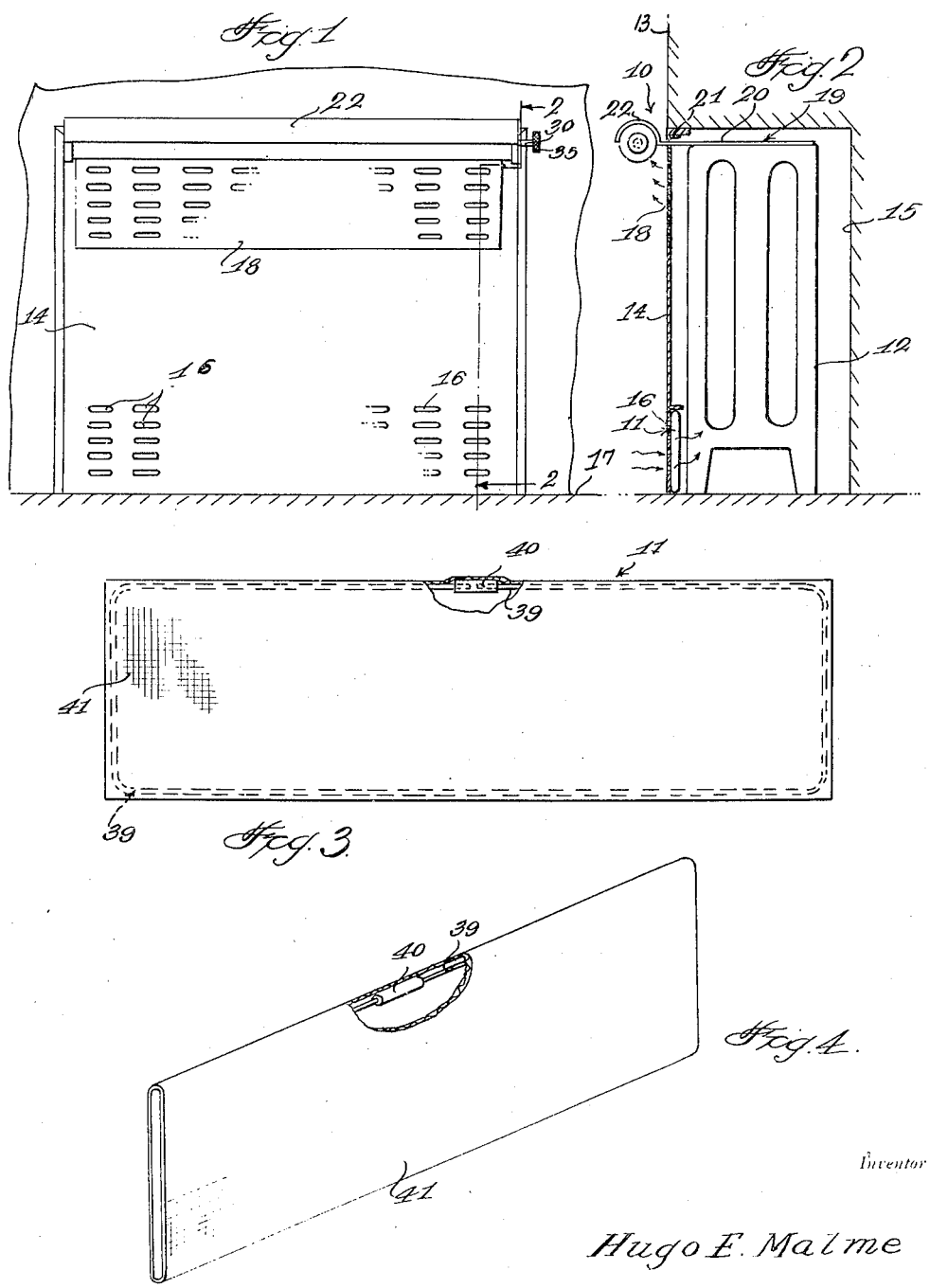

2,493,257

UNITED STATES PATENT OFFICE 2,493,257

FILTER ATTACHMENT FOR RADIATORS

Hugo E. Malme, Linden, N. J.

Application August 13, 1947, Serial No. 768,345

4 Claims. (Cl. 183—73)

This invention relates to an attachment for filtering the air heated by the radiators of a heating system of a dwelling or other enclosure for extracting dust and dirt from the air which is heated and caused to circulate by the heat given off by a radiator to thereby minimize the amount of dirt and dust adjacent a radiator and to maintain the area adjacent the radiator, including curtains, walls and blinds in a cleaner and more sanitary condition.

Still another object of the invention is to provide an air filter which is especially adaptable to recessed radiators, but which is capable of use with heating radiators generally.

A further object of the invention is to provide an improved construction of filter including means to permit the filtering means to be readily removed and replaced.

A further object of the invention is to provide a filter which will function for filtering the air drawn into proximity to the lower portion of a radiator by the heat radiated therefrom and for additionally filtering the air, after heating, when expelled from the upper part of the radiator by the natural tendency of the heated air to rise.

Various other objects and advantages of the invention will hereinafter become more fully apparent from the following description of the drawings, illustrating a preferred embodiment thereof, and wherein:

Figure 1 is a front elevational view showing a recessed radiator and with the filter attachment applied thereto;

Figure 2 is a vertical sectional view, partly in side elevation, taken substantially along a plane as indicated by the line 2—2 of Figure 1;

Figure 3 is a plan view, partly broken away, showing the lower, intake filter on an enlarged scale;

Figure 4 is a perspective view, partly broken away thereof;

Figure 5 is a top plan view of the upper filter support;

Figure 6 is a side elevational view thereof, looking toward the outer side of the filter support and showing the filter mounted therein;

Figure 7 is an end elevational view looking toward one end of the filter support;

Figure 8 is a similar view looking toward the the opposite end thereof, and

Figure 9 is an exploded perspective view of the various parts of the upper filter and filter support, shown disconnected.

Referring more specifically to the drawings, for the purpose of illustrating one preferred adaptation and use of the air filter, constituting the invention and designated generally 10 and 11, the numeral 12 designates a conventional hot water or steam radiator of a heating system of a dwelling or other enclosure and which is shown as being recessed in a wall 13 and provided with a closure 14 for closing the open front of the recessed portion 15 of said wall 13. The closure 14 may be of any conventional construction and ordinarily includes an opening 16 in the lower portion thereof through which cold air from adjacent the floor 17, on which the radiator 12 is supported, may be drawn into the lower portion of said radiator by the heat being radiated therefrom. The closure 14 is also provided with a grilled opening 18 adjacent its upper edge through which the heated air from the radiator 12 is emitted back into the room of which the wall 13 and floor 17 form a part, and which grilled opening 18 may have the grill work thereof arranged as is conventional, for deflecting the heated air in any desired direction therefrom.

The upper filter 10, for filtering the air after heating by the radiator 12 and which is exhausted through the grilled opening 18, as best seen in Figures 5 to 9, includes a holder, designated generally 19 comprising a plate having an elongated, relatively wide and substantially flat portion 20 which extends through a slotted opening 21 in the upper portion of the recess closure 14 and above its grilled opening 18 and which is supported thereby and by the inner portion of the plate 20 resting upon the top of the radiator 12. The outer, longitudinal edge of the filter support 19, which is disposed outwardly of the closure 14 and adjacent thereto, is bent upwardly to define a downwardly opening, substantially semi-circular part 22, which extends from end to end of said support 19 and the open bottom of which is disposed in substantially the same plane as the plate 20.

A cap-shaped end member, designated generally 23 including a disk portion 24 and an annular flange 25 projecting from one side thereof, is mounted in and fixedly secured to one end of the semi-circular portion 22 and so that the upper half of the flange 25 is disposed in said end of the semi-circular portion 22, and the other half of the flange 25 depends downwardly therefrom as does the lower half of the disk 24. The opposite end of the semi-cylindrical portion 22 is closed by an end member 26, as best seen in Figure 9, having a disk 27 of a diameter substantially corresponding to the cap 23 and a semi-circular flange 28 extending substantially half the distance therearound and which is disposed within said opposite end of the semi-cylindrical portion 22 and suitably secured thereto, as by welding, and so that the ends of the flange 28 will terminate at approximately the open bottom of the portion 22. The disk 27 is provided with a central opening 29 forming a journal for a shaft 30 having a restricted portion which extends inwardly therethrough and which is suitably secured, adjacent its inner end and inwardly of the disk 27, to a retaining member, designated generally 31 and which substantially corresponds to the end member 26 and includes a disk 32 which is centrally connected to the shaft 30, and a semicircular flange 33, which projects from the side thereof, away from the shaft 30 or inwardly of the semi-cylindical portion 22. A washer 34 is preferably interposed between the disk portions 27 and 32 and a knurled knob 35 is fixed to the outer end of the shaft 30.

A filter, designated generally 36 and best illustrated in Figure 9, is adapted to be detachably mounted in the semi-cylindrical portion 22 by the retaining end members 23 and 26, 31. The filter 36 includes an elongated cylinder 37 formed of mesh wire fabric, preferably copper wire, which is covered by a cylinder 38 of cloth, such as cheesecloth and which is lightly oiled. To apply the filter 36 to the upper filter support 19, one end thereof is inserted into the retaining flange 25 and with the retaining member 31 disposed with its flange 33 within the flange 28, it will be readily apparent that the opposite end of the cylindrical filter 36 can be disposed, as shown in Figure 6 and after which by rotating the knurled knob 35 a one-half turn, the retaining member 31 will be rotated a half turn for positioning its flange 33 under the lower part of said last mentioned end of the filter 36 for detachably retaining it in its position of Figure 6.

Accordingly, it will be readily apparent that the heated air in passing outwardly through the grilled opening 18, will due to its heated condition, tend to rise as soon as it leaves the grilled opening 18, as indicated by the arrows in Figure 2, located adjacent said opening, and in so doing will wipe against or pass through a portion of the filter 36 and so that dust, dirt and other foreign matter carried by the air will be separated therefrom by the lightly oiled filter cloth 38. When the filter cloth 38 has become dry or soiled to an extent to prevent it properly performing its intended function, the knob 35 can be rotated a half a turn to position the flange 33 in an uppermost position and so that the filter 36 can be readily removed and replaced, or so that a new filter cloth 38 can be applied to the filter cylinder 37, and the filter 36 thereafter reapplied, as previously described.

In order to maintain the radiator 12 in a clean and sanitary condition and to twice filter the air heated thereby, the second filter 11 is provided and which includes an elongated, substantially rectangular frame, designated generally 39, which may be formed from a rod bent into the desired shape, and the ends of which are connected by a coupling or sleeve member 40. A cylinder or sleeve of filter material 41, such as cheesecloth is stretched over the frame 39 and said filter 11 is then detachably secured in the bottom, intake opening 16 and so that the cold air drawn into the recess 15 will be filtered in passing through the filter cloth 41.

Obviously, the filters 10 and 11 may be used separately if desired, and the filter 10 may be employed with any radiator, whether recessed or not, and with non-recessed radiators the plate 20 may be suitably secured, as by soldering or welding to the upper surface of the radiator 12 or may be detachably fastened thereto in any desired manner, and various other modifications and changes are likewise contemplated and may obviously be resorted to, without departing from the spirit or scope of the invention as hereinafter defined by the appended claims.

I claim as my invention:

1. A filter for heating radiators, comprising a filter support having an elongated portion adapted to be supported on the upper surface of a heating radiator and longitudinally thereof, said support having a semi-cylindrical, downwardly opening portion disposed outwardly of one side of the radiator and including end portions provided with inwardly projecting flanges, a cylindrical filter member mounted in said semi-cylindrical portion and detachably engaged and supported by the flanges of said end portions, and one of said end portions including manually rotatable means and a rotatable section carrying a semi-cylindrical portion of the flange thereof and movable to positions for engaging or disengaging an end of the cylindrical filter for demountably supporting it in the semi-cylindrical portion of the support.

2. A filter for heating radiators, comprising a filter support adapted to be mounted on the top surface of a heating radiator and having a portion disposed beyond one side thereof and extending lengthwise of the radiator, said support portion having filter retaining end members mounted thereon, a cylindrical filter demountably supported by said end members, and one of said end members including a rotatably mounted, semi-cylindrical and inwardly extending flange for engaging the cylindrical filter in one position thereof and for disengaging the filter in another position thereof for demountably supporting the filter between said end members.

3. An air filter for heating radiators, comprising a filter support adapted to be mounted on the upper surface of a radiator and having a portion extending outwardly from a side of the radiator, filter retaining members supported by said portion of the filter support and disposed outwardly of said side of the radiator and longitudinally thereof, one of said filter retaining members comprising a cap-shaped member having an inwardly extending flange, the other of said retaining members comprising a rotatably mounted disk having an inwardly extending, substantially semi-circular flange, and a cylindrical, porous filter member supported between said filter retaining members, said filter being demountable from the retaining members by the rotation of the disk and semi-cylindrical flange through an arc of 180 degrees for positioning said flange above an end of the cylindrical filter.

4. A filter as in claim 3, said support including a hood of semi-circular cross section and disposed in downwardly opening position and to the ends of which said filter retaining members are connected.

HUGO E. MALME.

REFERENCES CITED

The following references are of record in the file of this patent:

UNITED STATES PATENTS

| Number | Name | Date |
|---|---|---|
| 344,794 | Miller | Jan. 26, 1886 |
| 842,914 | Schafer | Feb. 5, 1907 |
| 1,490,101 | Garrett | Apr. 15, 1924 |
| 1,777,210 | Lebherz | Sept. 30, 1930 |
| 1,782,374 | Walls | Nov. 18, 1930 |